United States Patent [19]

Hastwell

[11] 4,195,488
[45] Apr. 1, 1980

[54] COOLING SYSTEM

[76] Inventor: Peter J. Hastwell, 133 Mills Ter., North Adelaide 5006, South Australia, Australia

[21] Appl. No.: 909,657

[22] Filed: May 25, 1978

Related U.S. Application Data

[63] Continuation of Ser. No. 682,168, Apr. 30, 1976, abandoned.

[30] Foreign Application Priority Data

May 5, 1975 [AU] Australia ............... PC 1478

[51] Int. Cl.² ........................... F24J 3/02
[52] U.S. Cl. ........................... 62/4; 165/DIG. 17
[58] Field of Search ............ 62/2, 4, 76, 330; 126/263; 165/2, 105, DIG. 17; 122/21

[56] References Cited

U.S. PATENT DOCUMENTS

| | | | |
|---|---|---|---|
| 1,541,968 | 6/1925 | Knight | 62/4 |
| 1,738,342 | 12/1929 | Zellhoefer | 62/4 |
| 2,044,750 | 6/1936 | Bryant | 62/4 |
| 3,894,528 | 7/1975 | Stubblefield | 62/2 |
| 3,972,183 | 8/1976 | Chubb | 126/263 |
| 3,973,552 | 8/1976 | Ervin | 126/263 |

Primary Examiner—Hiram H. Bernstein
Attorney, Agent, or Firm—Haseltine, Lake & Waters

[57] ABSTRACT

A method of cooling a fluid medium in a heat exchanger by means of an endothermic heat of solution of crystals which are in contact with a heat exchanger in the base of a closed column where the solvent dissolves the crystals whereby to form a saturated solution which cools the heat exchanger, and applying heat to the saturated solution in an upper part of the column to vaporize the solvent and pass it to a condenser, the resulting super saturation causing recrystallization with the crystals sinking to the base of the column, the solvent condensate passing back to the base of the column to continue the endothermic solution of the crystals.

14 Claims, 2 Drawing Figures

COOLING SYSTEM

This is a continuation of application Ser. No. 682,168 filed Apr. 30, 1976 and now abandoned.

BACKGROUND OF THE INVENTION

This invention relates to a cooling system and in particular it relates to a system which is based on the use of endothermic heat of solution of a substance to operate the cooling system but which according to its simplest form requires no pumps or other moving elements.

It will be recalled that in the refrigeration by use of heat many inventions were involved, particularly in what is commonly known as "Absorption Refrigeration Systems," in which systems ammonia is commonly used. In these a boiler contains an aqueous solution of ammonia so that when heat is applied the solution is boiled to drive off ammonia vapour mixed with water vapour which passes through cooling tubes so that some of the water vapour passes back into the boiler but the remaining water is separated by a special water separator to allow ammonia gas, free from water, to pass into a condenser where it is condensed and gravitates into a low temperature radiator where absorption of latent heat of vapourization produced the required refrigeration. Such a system needs no pumps or mechanical circulation means.

While the system which forms the subject of this invention depends on thermal effects, that is it uses heat as a means of producing cold, the invention makes use of endothermic heat of solution, and the invention thus involves the use of an endothermic substance and a solvent, such as ammonium nitrate or ammonium thiocyanate solvated in water, although other substances and other solvents can be used, and are envisaged in this invention, the principle of the invention is the production of cold by submitting the endothermic substances to conditions where the substance is solvated.

It is known to use an endothermic substance using the heat of solution to produce a cooling effect, see Zellhoefer U.S. Pat. No. 1,738,342, in which sufficient heat is applied to a system outside of a column; which column is vented to the air to transport the endothermic medium in liquid form to a vented station above the columns where the solvent is evaporated. The endothermic substance is liquified by the application of heat to follow downward through the column and the molter endothermic medium is returned to the column via a vented oil heat exchanger. There is no upward flow of endothermic medium within the column.

DISCUSSION OF INVENTION

The mechanism of this invention involves a column in which the solution rises partly due to displacement of solution at the lower part of the column by the referred crystals but also due to the addition of solvent at the base of the column. The endothermic substance crystallizes at an upper point where heat is applied to the column to cause vapourization of the solvent, and the crystals sink back through the solution in the column to displace saturated solution to again dissolve at the base of the column to absorb more heat, the system operating in a closed circuit which has a relatively high degree of vacuum within it to aid vapourization, the vapour passing to a condenser where the vapour is liquified and the liquid then flows back from the condenser preferably in heat exchange with the lower part of the column to add to the solution in the base of the column to further dissolve crystals and thereby to maintain a required temperature gradient and flow in the system.

It is necessary to prevent convection in the column to prevent the hot solution which may boil vigourously in the top of the column from mixing with the cold solution and crystals in the bottom of the column, and the invention also relates to a construction which ensures a minimum convection effect, the apparatus thus preferably having a series of baffles or tubes through which the solution rises and through which the crystals move back into the cooling area.

Basically thus the method comprises containing the endothermic medium in crystal form in the base of a closed column which also contains the heat exchanger, maintaining a vacuum in the column, applying a solvent to the endothermic substance in the column, whereby to dissolve the crystals in the solvents to lower the temperature at the heat exchanger by endothermic solution and allowing the resultant saturated solution to rise in the column, applying heat by means of an applicator to the saturated solution in an upper part of the column to vapourize the solvent, drawing off the vapour into a condenser whereby to recrystallize the said endothermic medium and allowing the crystals to sink to the base of the column, recirculating the solvent condensate from the condenser back to the base of the column whereby to continue the endothermic reaction, and utilizing the reduced temperature produced at the heat exchanger to cool a medium, the chamber containing sufficient endothermic substance to leave crystals at the base of the chamber at maximum heat application to the solution.

The invention depends for its operation chiefly on maintaining the heat gradient between the base of the column and the crystallization zone and the fact that crystallization takes place at a higher level than the cooling action, preferably axially above it, so that the hot solution from the crystallization zone cannot pass downward to the base of the column, similarly the solution in the base of the column because of its low temperature does not rise into the crystallization zone but tends to remain in the base of the column until displaced by crystals and solvent which endothermically solvates the crystals in the bottom of the column. Communication between the crystallization zone and the base of the vessel is through tubes or a grid arranged to avoid convection currents and diffusion because of density differences which could cause circulation and interfere with efficient thermal separation between the crystallization zone and the cold producing zone in the base of the column.

In order however that the nature of the invention may be fully understood embodiments thereof will now be described with reference to the accompanying drawings which are to be taken as illustrative of the principle only and not necessarily to limit constructional details shown.

PREFERRED EMBODIMENT

Figure 1:
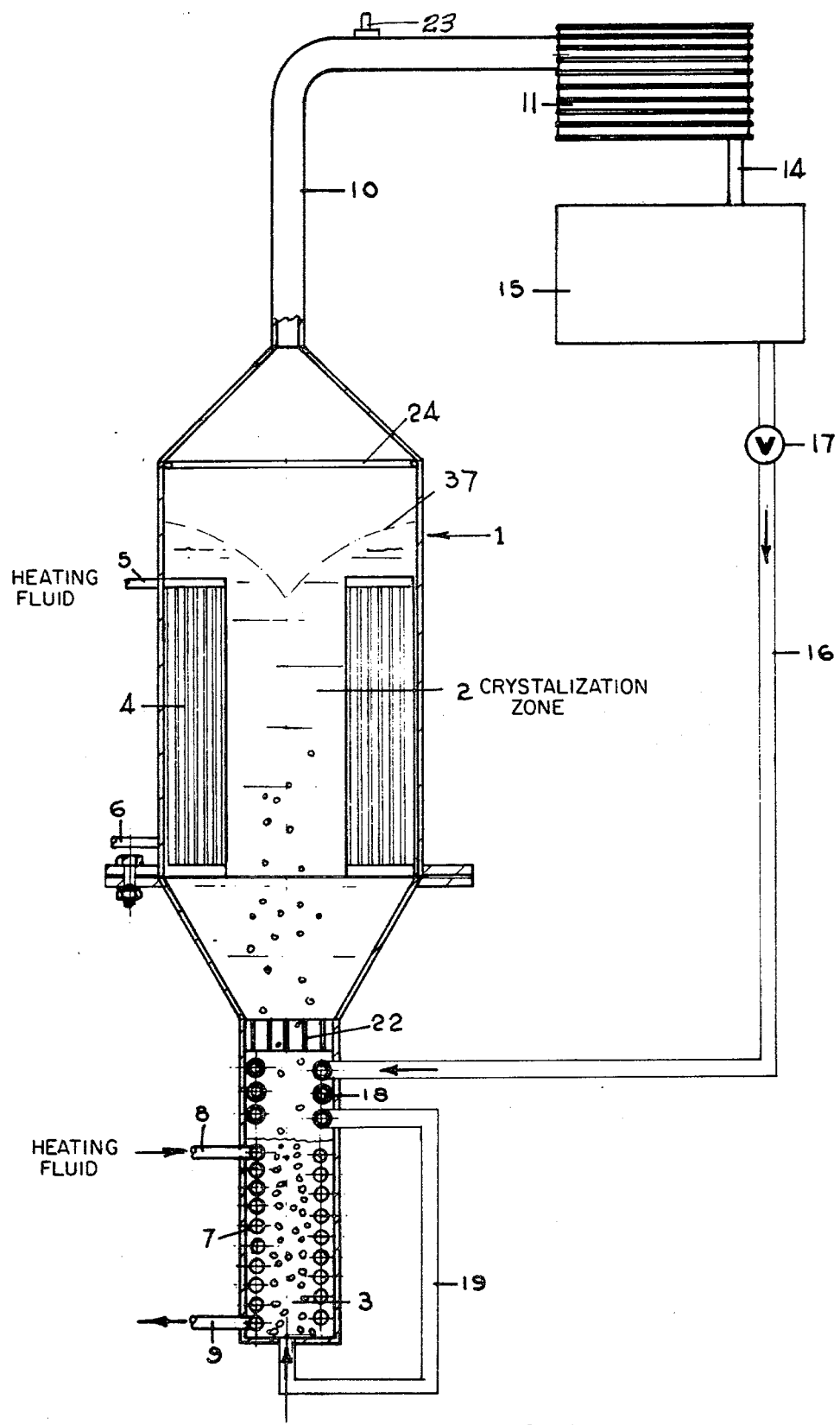
FIG. 1 is a sectional side elevational schematic view of one form of the invention and FIG. 2 is a schematic view of another form of the invention using a cascade system as for instance applied to the production of cold by solar energy means.

Referring first to FIG. 1, a column 1 comprises an upper expanded crystallization zone 2 and a lower cold producing zone 3, the crystallization zone 2 having within it a heat applicator 4 which is preferably a vertical tube heat exchanger having an inlet 5 and an outlet 6 for fluid which has been heated by any suitable means.

In the cold producing zone 3 of the column 1 is a heat exchanger 7 which is adapted to have circulated through it from an inlet 8 and an outlet 9 a suitable fluid which can transmit cold produced in the zone 3 to any required device such as a cooling unit, the top of the column 1 being connected by a line 10 to a condenser 11 in which vapour from the crystallization zone 2 is condensed.

The condensate flows through the line 14 to a condensate storage tank 15 which in turn connects with a line 16 through a flow regulating valve 17, the line 16 passing to a heat exchanger 18 which is disposed between the heat exchanger 7 and the crystallization zone 2 of the column 1, flow from the heat exchanger 18 passing through the line 19 back into the cold producing zone 3 of the column 1.

In operation the base of the column 1 is filled with an endothermic substance, that is a substance which on solution lowers the temperature at the zone, the amount of endothermic substance which is normally in crystal form being sufficient to leave crystals at the base of the chamber 1 during periods of maximum heat application to a solution formed by a solvent in the said column which rises to a height of at least equal to the top of the heat applicator 4 under dynamic conditions.

Thus in a quiescent condition the column 1 contains a saturated solution which partly fills the column to a level within the heat applicator condenser 4 whereas the crystals which form the endothermic substance are retained in the base of the column 1 to surround the area of the heat exchanger 7.

Situated between the cold producing zone 3 of the column 1 and the heat applicator 4 of the crystallization zone 2 is a grid 22 which can be in the nature of vertical tubes or honeycomb and the purpose of which is to limit turbulence in the saturated solution in this column between the hot and cold areas, while a spray entrainer 24 is disposed between the saturated solution space in the column 1 and the condenser to limit loss of endothermic substance from the column 1.

In operation such a device is maintained under vacuum which can be applied in any manner such as by simply drawing a vacuum in the column 1 by connecting a vacuum pump to the one way nipple 23 or boiling solvent within the column to expel air and then sealing the vessel but this vessel has in its base the endothermic medium in crystal form which is thus in contact with the solvent which substantially fills the said vessel and as solvation of the crystals takes place in the cold producing zone 3 in the base of the column 1, saturation occurs in the column 2 extending through the grid 22 and into the crystallization zone 2 where because of the application of heat through the heat applicator 4 the temperature of the saturated solution is raised sufficiently in view of the vacuum in the column 1 to cause boiling of the saturated solution with the result that the vapour produced passes to the condenser 11 through the line 10 to thus lower the solvent content in this area to result in a super saturated solution which causes crystallization to take place of the endothermic substance, the crystals because they are heavier than the solution falling back through the grid 22 into the cold producing zone 3 at the base of the column 1.

As considerable activity occurs in the column 1 at the crystallization zone a spray entrainer 24 ensures that only the solvent vapour passes to the condenser 11.

From the condenser 11 the condensate flows back to the base of the column 1 through the condensate storage vessel 15 and the line 16 and while in the form illustrated such flow takes place through the heat exchanger 18, this is not an essential as the flow could go directly from the condenser to the base of the column 1 where the solvent then is again available to act on the crystals to again solvate the crystals with consequent cold production due to the endothermic effects.

Figure 2:
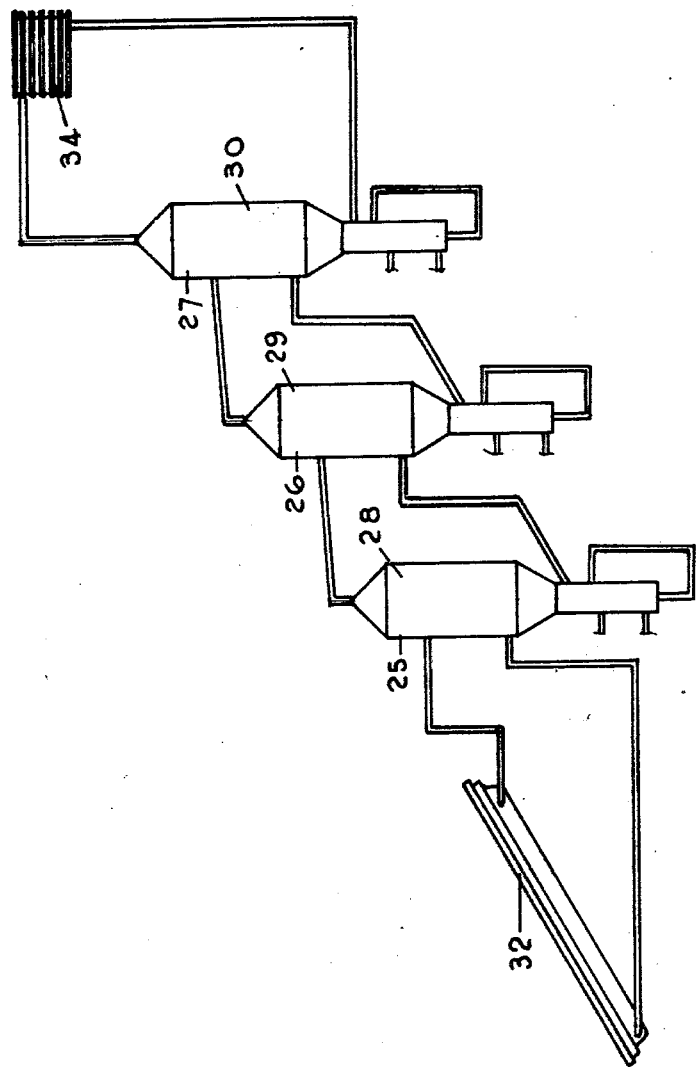

In the form of the invention shown in FIG. 2 a series of columns 25, 26 and 27 is shown, each of the zones having a heat applicator, designated respectively 28, 29 and 30, the heat applicator 28 of the first column 25 of the series being shown connected to a solar panel 32 to provide the necessary heat in the heat applicator 28, but the heat applicator 29 of the column 26 is the condenser of the column 25 while the heat applicator 30 of the column 27 is the condenser of the column 26, a condenser 34 being associated with the column 27.

Thus each column is independent and sealed and operates in the same way as the column 1 in the first described embodiment but the columns are arranged in cascade form so far as heat transfer is concerned, this giving an enhanced effect due to the more efficient heat utilization in the system in general.

Suitable substances with endothermic effects are substantial in number, but research carried out has shown that preferred substances are ammonium nitrate, ammonium thiocyanate, potassium nitrite, and potassium thiocyanate, which are all soluble in water which is preferably used as a solvent because water is an exceptionally bad conductor of heat and this helps to ensure correct temperature gradients between the base of the column 1 and the expanded crystallization zone 2 of the column. Other solvents and crystals can of course be used.

By using a storage vessel 15 and a flow control valve 17 it is possible to regulate the return of the condensate from the condenser 11 to the base of the column 1, thus aiding control of the rate of solution of the endothermic substance in the cold producing zone 3 of the column 1.

37 indicates approximately the upper level of the liquid in the column 1, the liquid of course being turbulent at this point due to the boiling or vapourizing action which takes place due to the application of heat to the crystallization zone.

It will be realized that according to the invention crystals held in the cold producing zone in thermal exchange with the heat exchanger 7 are solvated in this zone and the resultant saturated solution rises toward the top of the column 1 where the saturated solution is heated for the purpose of driving off the solvent such as water to receive it in the condenser 11 so that in this crystallization zone the saturated solution reaches a stage where crystal formation again takes place and as stated earlier because of the relative weight of the crystals these pass down the column 1 under gravity to again enter the cold producing zone at the base of the column 1 where solvation again takes place and so the process continues so long as a correct heat balance is maintained between the heat applied at the heat applicator and the cold withdrawn at the heat exchanger in the base of the column 1.

I claim:

1. A method of cooling a fluid medium in a sealed exchanger by means of an endothermic process, which method comprises:
   (a) introducing endothermic medium in crystal form in the base of a closed column which also contains the said heat exchanger,
   (b) applying a solvent to the endothermic substance in the said column, to thereby dissolve the said crystals in said solvent causing a decrease in the temperature at the heat exchanger by endothermic solution,
   (c) applying a vacuum in the said column,
   (d) applying heat by means of an applicator to the saturated solution in an upper part of said column to vapourize the said solvent,
   (e) drawing off the said vapour into a condenser and recrystallizing said endothermic medium to allow the crystals to fall by gravity from said upper part of said column to the base of the said column, to displace cold saturated solution upwardly in said column in counter flow to said crystals,
   (f) causing the crystals as they sink back to the base of the said column, to pass through a flow restrictor in said column disposed between said heat applicator and said base of the column to limit turbulence and transfusion in the liquid in the said column between hot and cold areas,
   (g) recirculating the solvent condensate from the said condenser back to the base of the said column to continue the endothermic process, whereby together with the downflow of crystals to cause the upward displacement of the cold saturated solution, and
   (h) cooling said fluid medium in said heat exchange by said decrease in temperature, said chamber containing sufficient endothermic substance to leave crystals at the base of the chamber at maximum heat application to said solution.

2. The method of claim 1, wherein the recirculating condensate from the condenser is brought into heat exchange with the endothermic solution at a point between said heat exchanger in the base of the column and said heat applicator.

3. The method of claim 1, wherein the said vapour is passed through a spray entrainer at the head of the said column to prevent the endothermic medium from passing to the said condenser.

4. The method of claim 1, wherein the condensate from the said condenser is passed into a storage tank and flow from the said storage tank to the said column and is controlled by a valve whereby to control the amount of solvent in said column.

5. The method of claim 1, wherein a series of said columns is used each sealed to be self-contained but in which the condenser of the first said column of the series is in heat exchange with the next column of the series to form the heat applicator of said second column and so on excepting for the last column of the series.

6. The method of claim 5, wherein the condensate from each said condenser is passed into a storage tank and flow from the said storage tank to the said column and is controlled by a valve whereby to control the amount of solvent in each said column.

7. The method of claim 1, wherein the heat applicator is a heat exchanger coupled to a solar panel.

8. An apparatus for cooling a fluid medium in a heat exchanger by means of endothermic solution including: a closed column having a base means adapted to receive an endothermic medium in crystal form and solvent for reaction with said crystals, said column being defined by an upper portion adapted to receive cold saturated solution to recrystallize therein and the reformed hot crystals to fall by gravity action through the said column into said base means to displace said cold saturated solution to flow upwardly in the same column in counter flow to the said crystals; heat exchanger means disposed in the base of said column being connectable for transmitting cooling medium to external means, heating means disposed in proximity to an upper portion of said column for vapourizing said solvent in the upper part of said column, condenser means communicating with the tip of said column arranged to draw vapourized solvent from the said column, and conduit means leading from said condenser means to said base means for transmitting condensate back to the said column to aid with the downflow of crystals and the upward displacement of the cold saturated solution, and grid restrictor means between the said heating means and the base of the column adapted to limit turbulence and transfusion in the said solution between hot and cold areas in the said column.

9. An apparatus as claimed in claim 8 wherein; conduit means are disposed at a point between said heat exchanger means in said base means of the column and said heating means for directing condensate from said condenser means into said endothermic solution.

10. An apparatus as claimed in claim 8, wherein: spray entrainer means are provided at the head of the said column for preventing said endothermic medium from passing to said condenser means.

11. An apparatus as claimed in claim 8, wherein: means disposed downstream of said condenser means stores condensate flow therein from said condenser means, said storage tank means having associated therewith valve means interposed between said storage tank means and column means for controlling flow from said tank means into said column means.

12. An apparatus as claimed in claim 8, wherein a plurality of said columns means are serially connected each being sealed and in which condenser means of a first column is in heat exchange relation with column means to form a heating means of a next column an adjacent means and so on, for each succeding column means of the said series, excepting the last column means of said plurality.

13. An apparatus as claimed in claim 12, wherein: each of said condenser means being connected to respective storage tank means for passage of condensate flow into associated storage tank means and back to the said column means, said condensate flow being controlled by valve means for governing the amount of solvent in each of said columns.

14. An apparatus as claimed in claim 8, wherein: said heating means being defined by heat exchanger means coupled to a solar panel means.

* * * * *